United States Patent [19]

Yamada et al.

[11] Patent Number: 4,986,625
[45] Date of Patent: Jan. 22, 1991

[54] OPTICAL FIBER CONNECTOR WITH RETAINER

[75] Inventors: Hiromi Yamada, Yokosuka; Eiji Yoshida, Sagamihara; Kenji Takahasi, Machida, all of Japan

[73] Assignee: AMP Incorporated, Harrisburg, Pa.

[21] Appl. No.: 391,642

[22] Filed: Aug. 7, 1989

Related U.S. Application Data

[63] Continuation of Ser. No. 241,000, Sep. 6, 1988, abandoned, which is a continuation of Ser. No. 80,516, Jul. 27, 1987, abandoned.

[30] Foreign Application Priority Data

Dec. 26, 1985 [JP] Japan .................... 60-299661
Mar. 31, 1986 [JP] Japan .................... 61-074099

[51] Int. Cl.$^5$ .............................................. G02B 6/36
[52] U.S. Cl. .............................................. 350/96.20
[58] Field of Search ............. 350/96.20, 96.21, 96.22; 250/227, 552; 357/17, 19, 30, 74

[56] References Cited

U.S. PATENT DOCUMENTS

| | | | |
|---|---|---|---|
| 3,510,641 | 5/1970 | Reynolds | 350/96.20 |
| 3,517,981 | 6/1970 | Rueger et al. | 350/96.20 |
| 3,569,933 | 3/1971 | Longenecker et al. | 340/79 |
| 3,572,891 | 3/1971 | Longenecker | 350/96.20 |
| 3,637,284 | 1/1972 | Plyler | 350/96.20 |
| 3,705,756 | 12/1972 | Kaller et al. | 350/96.20 |
| 4,081,208 | 3/1978 | Meade | 350/96.20 |
| 4,134,641 | 1/1979 | Kao et al. | 350/96.20 |
| 4,268,756 | 5/1981 | Crouse et al. | 250/551 |
| 4,327,964 | 5/1982 | Haesly et al. | 850/96.20 |
| 4,415,232 | 11/1983 | Caron | 350/96.21 |
| 4,418,983 | 12/1983 | Bowen et al. | 350/96.21 |
| 4,479,696 | 10/1984 | Lubin et al. | 350/96.20 |
| 4,547,039 | 10/1985 | Caron et al. | 350/96.20 |
| 4,645,295 | 2/1987 | Pronovost | 350/96.20 |
| 4,678,264 | 7/1987 | Bowen et al. | 350/96.20 |

FOREIGN PATENT DOCUMENTS

| | | |
|---|---|---|
| 0092338 | 10/1983 | European Pat. Off. . |
| 0092980 | 11/1983 | European Pat. Off. . |
| 2175547 | 3/1972 | France . |
| 2349151 | 11/1977 | France . |
| 58-174916 | 10/1983 | Japan . |
| 62-17772 | 12/1983 | Japan . |

OTHER PUBLICATIONS

Patent Abstracts of Japan-vol. #8, No. 14 (P-249)(1451), 21 Jan. '84.
Research Disclosure #218, 6/82, p. 196 (Havant, Hampshire, GB) #21822.
"Optimate Fiber Optic Interconnection System", Catalog-Amp 83-718 Issued 3-85.

Primary Examiner—John D. Lee

[57] ABSTRACT

An optical fiber connector comprises a retaining plate (20,60,85,95,113,142,173) made of comparatively thin sheet metal and having a slot (22,61,86,113a,173a) formred therein which has an opening at one end, the opening having a width smaller than an outer diameter of an optical fiber jacket (5a,101b,103a) and larger than a diameter of a fiber optic core (5a,101a, 103d). The retaining plate is inserted in a connector body (10,70,80,90,111,141,171) at almost a right angle to an axial direction of the optical fiber cable (5,101,103) disposed in the connector body with the opening of the slot facing toward the optical fiber cable, and the retaining plate is pressed into the connector body and the jacket of the optical fiber cable in the connector body.

20 Claims, 10 Drawing Sheets

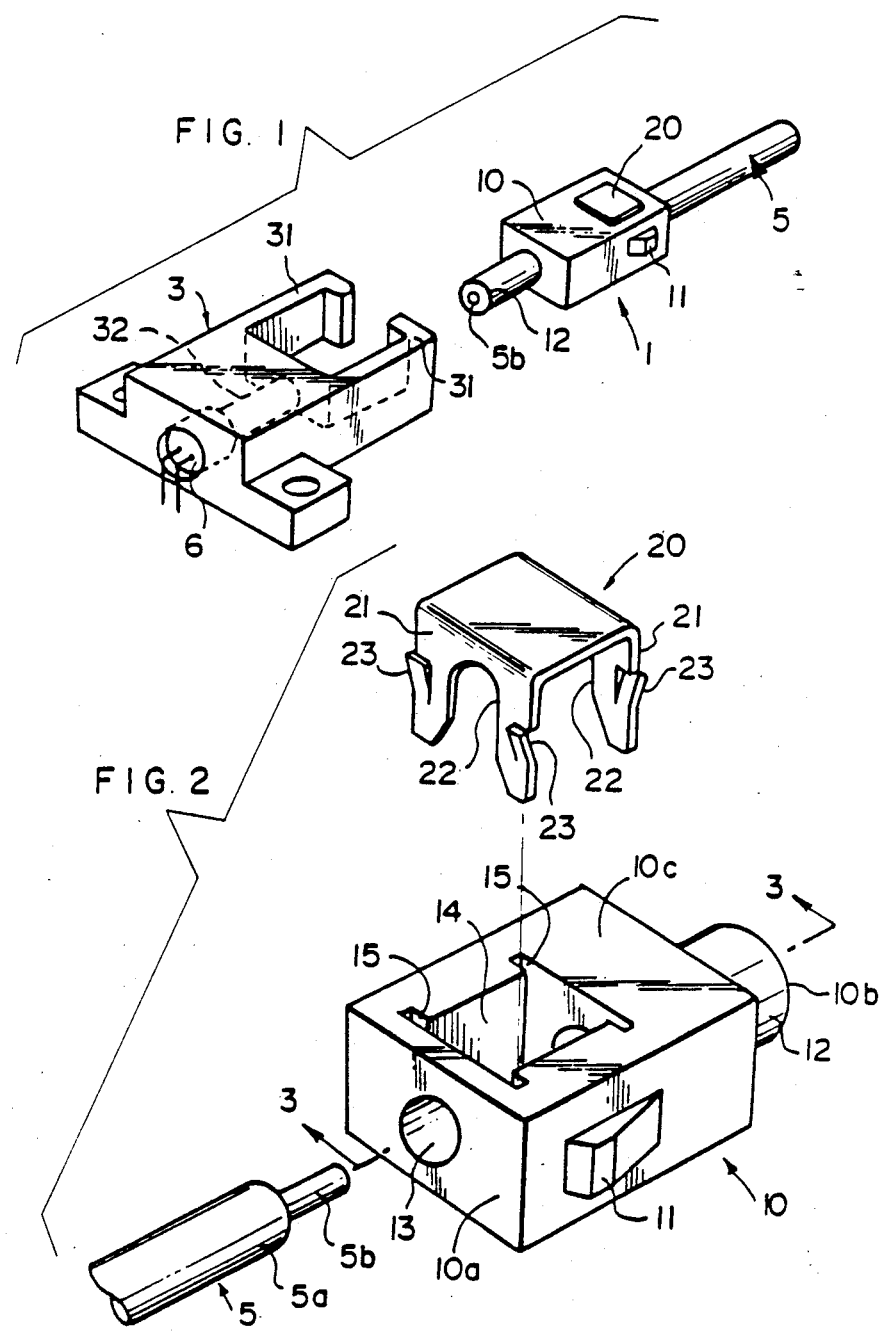

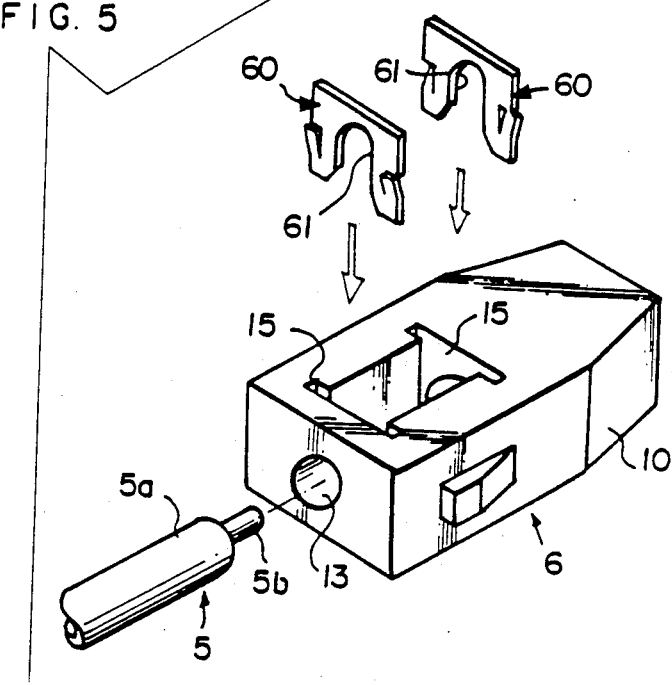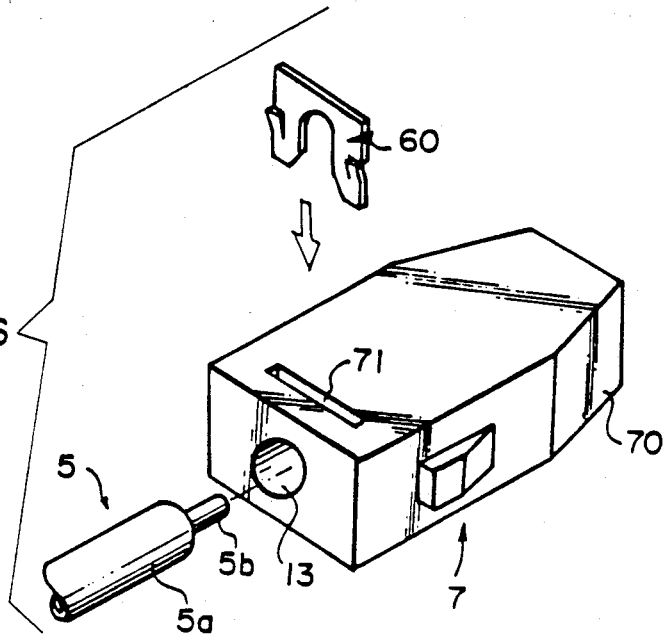

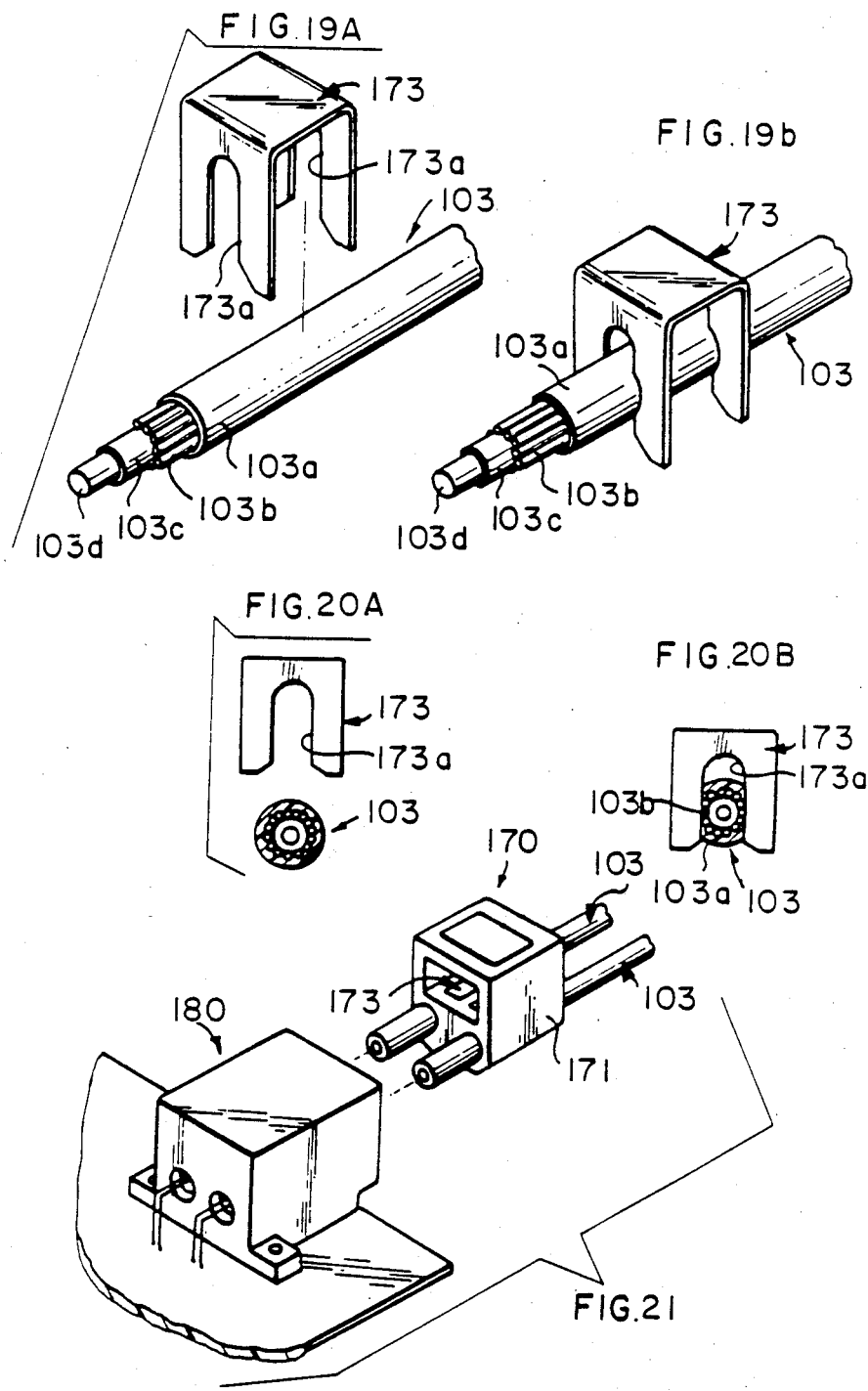

OPTICAL FIBER CONNECTOR WITH RETAINER

This application is a Continuation of application Ser. No. 07/080,516 filed July 27, 1987, now abandoned, in turn, a Continuation of application Ser. No. 07/241,000 filed Sept. 6, 1988, now abandoned.

This invention is related to an optical fiber connector which is used for connecting optical fibers for transmitting light signals between photo transmitters and receivers. The connector is also used for connecting electrical wires for transmitting power to another connector.

Optical fiber cables used for signal transmission are composed of a linear core formed of optical glass or plastic, and a jacket made of a resin such as urethane, polyethylene, or vinyl covering the outer surface of the glass or plastic core. Such cables are used in various fields such as optical communication.

When transmitting light signals by an optical fiber cable, the photo signal is transferred by disposing the end portion of the optical fiber to the transmitter or receiver for receiving light signals to the end of another optical fiber to which it is connected and the signal is transferred between the ends of these optical fibers. For the connection mentioned above, various types of optical connectors have been disclosed. For example, the connector disclosed in Unexamined Japanese patent application No. 58-174916, the end portion of an optical fiber cable which is inserted inside the connector housing is clamped by a fastening member which is press-fitted between the connector housing and the optical fiber cable, and thus the optical fiber cable is firmly retained in the connector housing. Namely, the fastening member retains the end portion of the optical fiber cable inside the connector housing by clamping, and a firm fixation of the optical fiber cable is created by the clamping force.

However, when using these connectors, a problem arises wherein the optical fiber cable can be pulled out if the clamping force of the fastening member is weak, and conversely, if the clamping force is too strong, a loss of the light signal during transmission may occur because the fiber optic core is compressed and deformed by this clamping force if the fiber optic core is made of plastic. Further, where a fixed retention by this clamping force is obtained by the elastic deformation of the jacket, the elastically deformed portion is permanently deformed according to the condition and period of use of the optical fiber cable, and then a problem arises in that the optical fiber cable is liable to come loose from the connector, since the elasticity decreases and thus the clamping force is also decreased. Further, it is known to apply an adhesive to retain the end portion of the optical fiber cable in the connector thereby securing the optical fiber cable to the connector. This practice is inconvenient and it is difficult to use for automated manufacturing.

In consideration of the fore-mentioned problems, the object of this invention is to provide a connector that does not compress the fiber optic core of an optical fiber cable, but firmly and securely retains the end portion of the optical fiber cable in the connector, and further, to provide a connector with a simplified structure in which the optical fiber cable is easily and firmly retained in position in the connector with no loss of light transmission of the fiber optic core.

Another object of this invention is the provision of a connector that also electrically connects with and retains an electrical wire in the connector.

The optical fiber connector of this invention is characterized in that a retaining plate is made of comparatively thin sheet metal and having a slot formed therein which has an opening at one end, the opening having a width smaller than an outer diameter of an optical fiber jacket and larger than a diameter of a fiber optic core. The retaining plate is inserted in a connector body at almost a right angle to an axial direction of the optical fiber cable disposed in the connector body with the opening of the slot facing toward the optical fiber cable, and the retaining plate is pressed into the connector body and the jacket of the original fiber cable in the connector body.

The optical fiber connector is also characterized by having a photoelectronic element receiving cavity at the opposite end where the end portion of an optical fiber cable is inserted into the connector body, and after positioning the end of the optical fiber cable against the photoelectronic element which is fixed in the receiving cavity, inserting the slotted retaining plate into the connector body at almost a right angle to an axial direction of the optical fiber cable with the opening of the slot facing toward the optical fiber cable, then pressing the slotted retaining plate into the jacket of optical fiber cable to firmly retain the end of the optical fiber cable in the connector body.

Further, the optical fiber connector is characterized by a passageway which extends from one end to the opposite end of the connector body, and the ned portions of a pair of optical fiber cables are inserted into the passageway so that the end faces of the optical fiber cables are engaged at the middle of the passageway, then the slotted retaining plates are inserted respectively into the connector body at almost a right angle to an axial direction of the optical fiber cables with the opening of the slot facing toward the optical fiber cables, the retaining plate is then pressed into the jacket of each optical fiber cable to firmly retain the end portions of both optical fiber cables in the connector body.

The hybrid optical-electrical connector of this invention comprises a connector housing having holes wherein end portions of an optical fiber cable and a wire are inserted, and the end portions of the optical fiber cable and of the wire are engaged by a contact and retaining plate made of a conductive material and fitted inside the connector housing. The contact plate retains the end portions of the optical fiber cable and the wire, and is also connected with the conductor of the wire in the connector housing. When the hybrid optical-electrical connector is engaged and connected with a matable connector, and electric contact of the matable connector is electrically connected with the contact plate.

A brief description of the drawings of the invention is set forth by way of example according to the following:

FIG. 1 is a perspective view of the optical fiber connector according to this invention.

FIG. 2 is a perspective exploded view of the plug connector as an optical fiber connector according to this invention.

FIGS. 5 and 6 are perspective exploded views showing different embodiments of the optical fiber connector according to this invention.

FIGS. 19A and 19B are respective perspective exploded and perspective views showing the engagement of the hybrid optical-electrical cable, which is integrally composed of the optical fiber and the wire, and the contact and retaining plate.

FIGS. 20A and 20B are cross-sectional views corresponding to FIGS. 19A and 19B.

FIG. 21 is a perspective exploded view showing the hybrid optical-electrical connector member together with the matable connector member using the cable shown in FIGS. 19A to 20B.

Figure 3A:
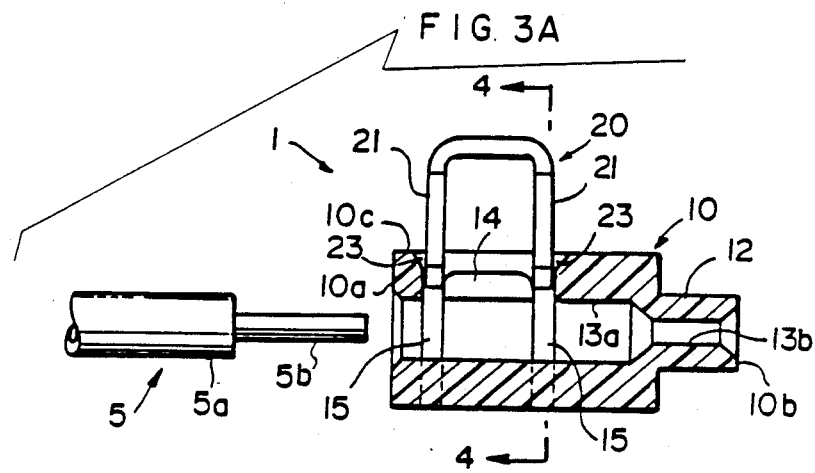
FIG. 3A to 3C are cross-sectional views taken along line 3—3 of FIG. 2 showing an assembly of the plug connector.

The following is a description of the preferred embodiments of this invention by way of example with reference to the drawings.

FIG. 1 is a perspective view showing the connector assembly of the optical fiber connector which is composed of a plug connector 1 wherein an end portion of an optical fiber cable 5 is secured, and a receptacle connector 3 wherein a photoelectric element 6 is secured. The plug connector 1 is an optical fiber connector according to an embodiment of this invention and is composed of a connector body 10 and a retaining plate 20. An end portion of an optical fiber cable 5 is inserted into the connector body 10 and is firmly retained therein by the retaining plate 20.

At this stage, a fiber optical 5b is inserted in connector body 10 to the end face of a cylindrical portion 12 of the connector body 10. Cylindrical portion 12 acts as a ferrule for the connector. The receptacle connector 3 has a cylindrical bore 32 which extends therethrough from the back to the front thereof, and at the front portion thereof, connector 3 has latching arms 31 which engage with engaging projections 11 of the connector body 10. A photoelectronic element 6 is secured in the rear end of cylindrical bore 32. This photoelectronic element 6, such as a light emitting diode or a photodiode, generates light signals to the optical fiber core. Photoelectronic element 6 can also be a photodetector. To connect the plug connector 1 with the receptacle connector 3, the cylindrical portion 12 is inserted into the cylindrical bore 32, latching arms 31 engage projections 11 and accordingly, the end face of the fiber optic core 5b is brought adjacent to or in contact with the outer face of the cylindrical portion 12, and opposite to the photoelectronic element 6.

Figure 3B:
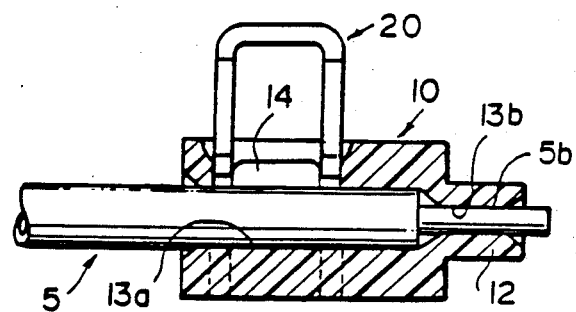
Figure 3C:
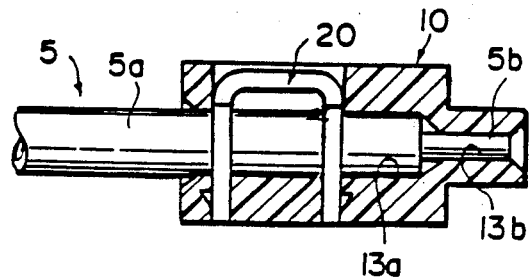

FIG. 2 shows details of the above-mentioned plug connector 1, and FIGS. 3A to 3C show a method of mounting the optical fiber cable 5 in the plug connector 1. Further, FIGS. 4A to 4C show a method of mounting the optical fiber cable 5 corresponding to FIGS. 3A and 3G.

The connector body 10 has a bore 13 extending from the rear end face 10a to the front face 10b of cylindrical portion 12. Bore 13 includes a rear section 13a having a diameter slightly larger than the outer diameter of the jacket of the optical fiber cable 5, and a front section 13b having a diameter slightly larger than the diameter of the fiber optic core 5b. Furthermore, the connector body 10 has an aperture 14 formed from an upper face 10c and in communication with the section 13a. At the back and front of this aperture 14, a pair of vertically extending retaining plate insertion slots 15 are formed.

Legs 21 of retaining plate 20 are inserted into the retaining plate insertion slots 15. The retaining plate 20 is metal formed into a U-shape and includes legs 21, which have U-shaped slots 22. Further, outwardly-directed resilient projections 23 are formed in legs 21.

Figure 4A:
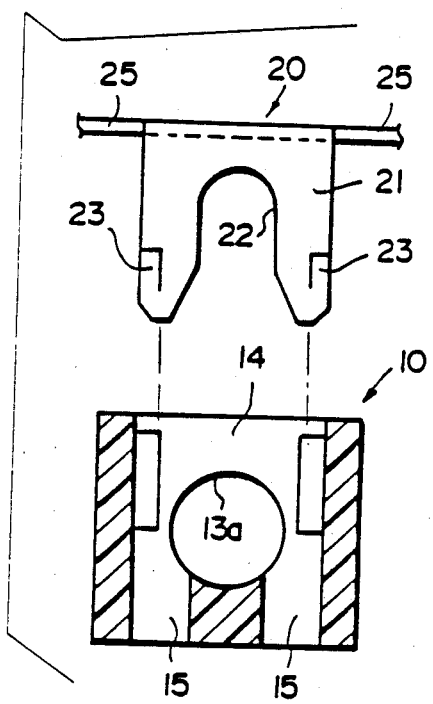
FIG. 4A to 4C are cross-sectional views taken along line 4—4 of FIG. 3A showing an assembly of the plug connector.
Figure 4B:
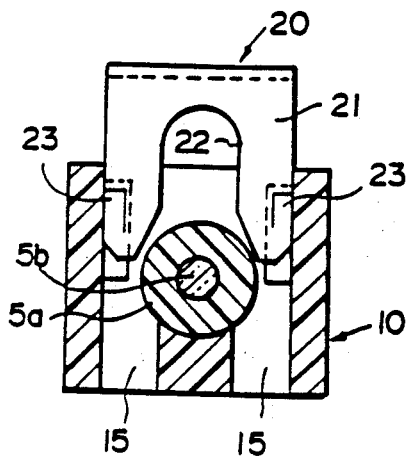
Figure 4C:
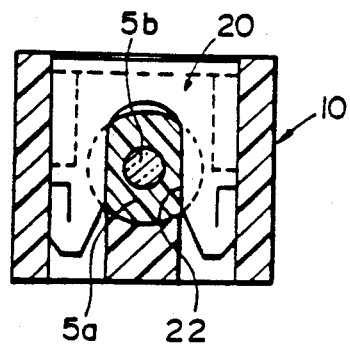

To mount the optical fiber cable 5 to the plug connector 1, first, a retaining plate 20 is removed from a carrier 25, as shown in FIG. 4A. Then, as shown in FIG. 3A, the legs 21 of retaining plate 20 are inserted into the plate insertion slots 15, such that the lower ends of both legs 21 do not reach section 13a, with the result that the retaining plate is retained therein by the engagement between the resilient projections 23 and the walls of plate insertion slots 15. Next, as FIGS. 3A and 4B show, the optical fiber cable 5 having a partly exposed portion of the core 5b at the end portion thereof is inserted into bore 13. At this stage the end portion of jacket 5a is inserted inside section 13a, and the exposed core 5b is inserted into the front section 13b as shown in FIG. 3B. The core 5b is disposed in section 13b and projects slightly forward from the front end face 10b.

The retaining plate 20 is then pushed down as shown in FIGS. 3C and 4C. Since retaining plate 20 is made of thin sheet metal, the edges of U-shaped slots 22 are pressed into the jacket 5a of the optical fiber cable 5. At this stage, the projections 23 of the retaining plate 20 dig into the walls of slots 15 and is retained therein thereby securing retaining plate 20 in position in connector body 10 with the edges of U-shaped slots 22 pressed into or penetrating the jacket 5a which secures cable 5 in position in bore 13 of connector body 10.

Further, since the width of the U-shaped slots 22 is smaller that the diameter of jacket 5a, the edges thereof press into or penetrate the jacket 5a; however, since slots 22 are larger than the diameter of the fiber optic core 5b, retaining plate 20 does not come into contact with the core 5b and create a compressive force thereof.

Next, the core 5b, which projects forward from the cylindrical portion 12 is cut off as shown in FIG. 3G.

According to the above, the retaining plate 20 firmly retains optical fiber cable 5 in the connector body 10 by the edges of U-shaped slots 22 pressing into or penetrating the jacket 5. In this case, since the retaining plate 20 performs no clamping onto clamp 5b, the problem of loss of transmission of the light signal by compressing the core does not arise, and a firm retention of the optical fiber cable 5 in the connector is effected.

The optical connector 6 shown in FIG. 5 is an example of employing two retaining plates 60 instead of employing the folded type retaining plate 20 in the case mentioned above. The same type of connector body 10 as shown in FIGS. 1 to 4 is used, and is constructed so that each retaining plate 60 is inserted into the respective plate insertion slot 15 to firmly retain the optical fiber cable 5 in the body 10. FIG. 6 shows only one of the above-mentioned retaining plates 60 being used so that in optical fiber connector 7, only one plate insertion slot 71 is formed in the body 70. Thus, the optical fiber cable 5, when inserted in bore 13, is firmly retained in the body 70 by using a single retaining plate 60.

Figure 7:
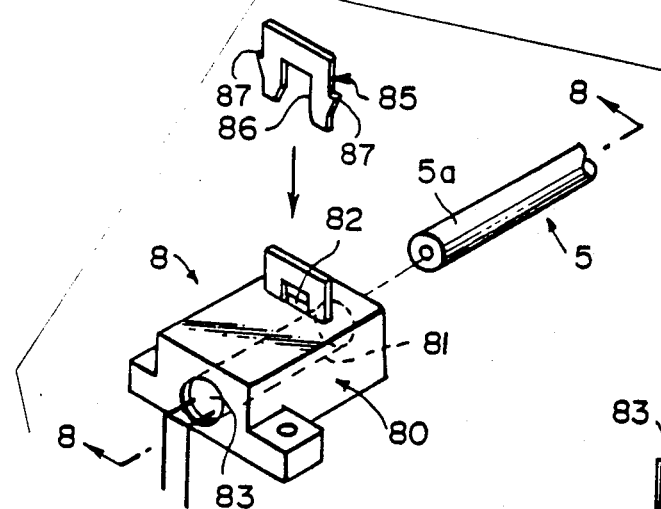
FIG. 7 is an exploded perspective view of a further embodiment according to this invention.

FIG. 7 shows an optical fiber connector 8 of the type in which plug and receptacle connectors shown in FIG. 1 are formed as one connector.

In this embodiment, a bore 81 extends from the rear face to the front face of the body 80, and the photoelectronic element 83 is mounted in rear section 84 of bore 81. Further, a plate insertion slot 82, which extends from the upper face of the body 80 to bore 81 is also formed, and after inserting the optical fiber cable 5 into bore 81, retaining plate 85 is inserted into plate insertion slot 82 and firmly retains the optical fiber cable by the edges of slot 86 of retaining plate 85 pressing into or penetrating the jacket 5a of the optical fiber cable 5.

Figure 8:
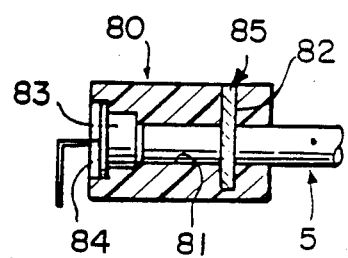
FIG. 8 is a cross-sectional view taken along line 8—8 of FIG. 7.

Further, the end face of the optical fiber cable 5, when secured in bore 81, is located adjacent or in contact with the photoelectronic element 83 so that the light signal is transferred between the optical fiber core and the photoelectronic element. Accordingly, FIG. 8 shows the optical fiber cable 5 firmly retained in the connector body 80. The retaining plate 85 used here is almost the same as the retaining plate 60 used for the connector in FIG. 6 except retaining plate 85 has barbs 87 for digging into the outer walls of slot 82 to secure plate 85 in body 80.

Figure 9:
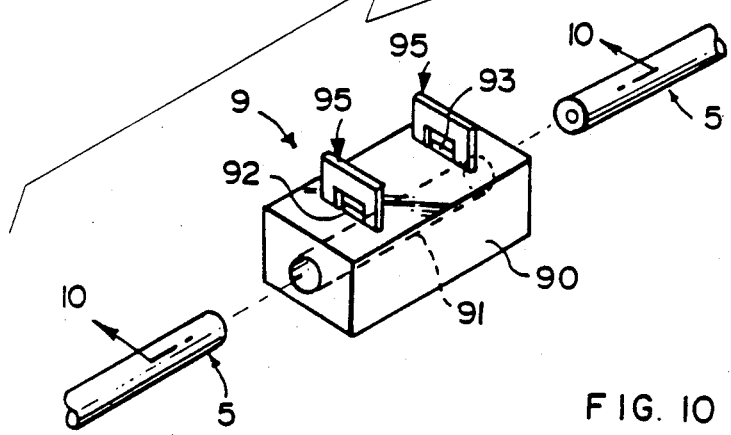
FIG. 9 is an exploded perspective view of an additional embodiment according to this invention.
Figure 10:
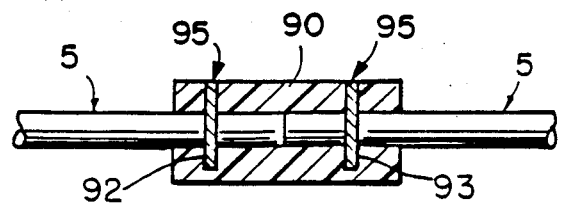
FIG. 10 is a cross-sectional view taken along line 10—10 of FIG. 9.

FIGS. 9 and 10 also show an embodiment of this invention which is a splice connector 9 that connects two optical fiber cables 5 together. In the connector body 90, a bore 91 extends through from one end to the other end thereof. Further, at two places near the ends at the upper face of body 90, plate insertion slots 92,93 are formed and they extend to the bore 91 from the upper face. The optical fiber cables 5 are inserted into bore 91 and the end faces of optical fiber cables 5 are brought close to or into contact with each other at the center of bore 91. At this stage, the retaining plates 95 are inserted into the respective plate insertion slots 92,93, and the slot of each plate 95 presses into or penetrates the jacket of each optical fiber cable 5 and thus firmly retains the pair of optical fiber cables 5 in the body 90 where the end faces of the fiber cores are brought close to or into contact with each other. Retaining plates 95 are also secured in position in slots 92,93 in the same manner as that of plate 85.

Since the optical connectors shown in FIGS. 7 to 10 require only one component, compared with the former requirement for two components which include the plug connector and the receptacle connector, the cost can be reduced since the number of components has been reduced, and further, the connecting operation of the optical fiber cable is simplified.

As explained above, according to this invention, since the optical fiber cable is firmly retained in the connector body by causing the retaining plate to press into or penetrate the jacket of the optical fiber cable when it is inserted in the connector body, a firm retention of the optical fiber cable is ensured, and further, the core is not deformed by a compression force created by the retaining plate.

Further, according to this invention, a connection between the optical fiber cable and the photoelectronic element is established by mounting the photoelectronic element directly to the connector body, and a connection between optical fiber cables is established by inserting the optical fiber cables into the connector body and the opposing end faces of both optical fiber cables are in engagement. This connection is then maintained because the optical fiber cables are firmly retained in the connector body by a retaining plate secured in the connector body which is pressed into or penetrates the jacket of the optical fiber cable. These connectors not only have an advantage of a firm retention of the optical fiber cables and a prevention of compressive deformation of the cores, but also enables the plug and receptacle to be one piece. Therefore, the cost of manufacturing is reduced since the number of components is reduced, and further, the connecting operation of the optical fiber cables in relation to the photoelectronic elements is simplified.

Figure 11:
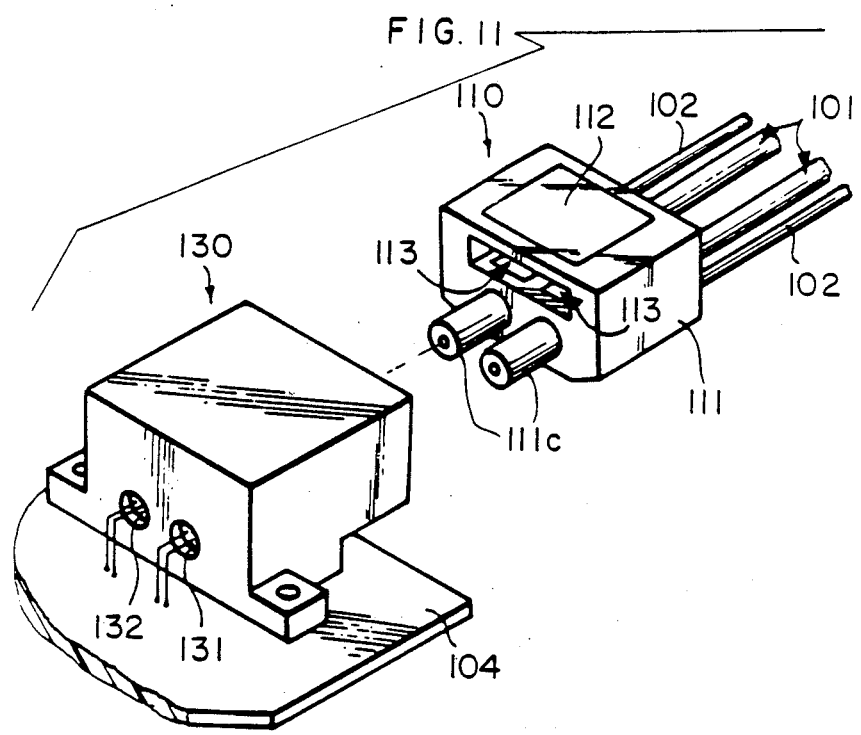
FIG. 11 is a perspective exploded view of a still further embodiment of the invention showing a hybrid optical-electrical connector member and the matable connector member.

FIG. 11 is a perspective view of a still further embodiment of the invention showing a hybrid optical-electrical connector 110 and the mating connecting 130 to which the connector 110 is to be mated. One end of two optical fiber cables 101 for transmitting and receiving light signals and one end of wires 102, which provide electrical power to the device to which the other end of optical fiber cables 101 are connected, are connected to the hybrid optical-electrical connector 110. Connector 130 is mounted on a P.C. board 104 and has a light-emitting element 131 to transmit light signals and a photosensitive element 132 to receive light signals secured thereto.

Figure 12:
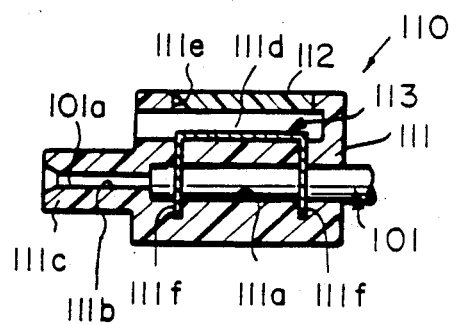
FIG. 12 is a cross-sectional view of the hybrid optical-electrical connector member of FIG. 11.

The connector 110 comprises a connector housing 111, a contact and retaining plate 113 made of a conductive material, and a detachable cover plate 112 which is fitted as a cover into an aperture 111e of the connector housing 111. As shown in FIG. 12, the connector housing 111 has a cable insertion bore 111a wherein an end of the entire optical fiber cable 101 is inserted, and a core insertion bore 111b which is in communication with cable insertion bore 111a in which the core 101a of the optical fiber cable 101 is inserted. This cable core 101a is arranged to match a front end face of a cylindrical portion 111c of the connector housing 111. Namely, this cylindrical portion 111c acts as a ferrule for the optical connector.

Further, although not shown in FIG. 12, the connector housing 111 is also formed with a wire insertion bore, and a wire 102 is inserted in the connector housing 111 along this wire insertion bore. Moreover, at the upper portion of the connector housing 111, a cavity 111d, which opens toward the front thereof, is formed. Further, in the upper wall of housing 111, a contact plate insertion aperture 111e is formed. Note, this contact plate insertion aperture 111e is used when the plate 113 is inserted from above, and receives a detachable cover plate 112 after the plate 113 is inserted therein, as shown in FIGS. 11 and 12.

When the contact and retaining plate 113 is inserted into the connector housing 111 through the contact plate insertion aperture 111e and retained inside the housing 111, it is engaged with the respective optical fiber cable 101 and wire 102, and thus retains the cable 101 and the wire 102 in the housing 111.

Figures 13A, 13B:
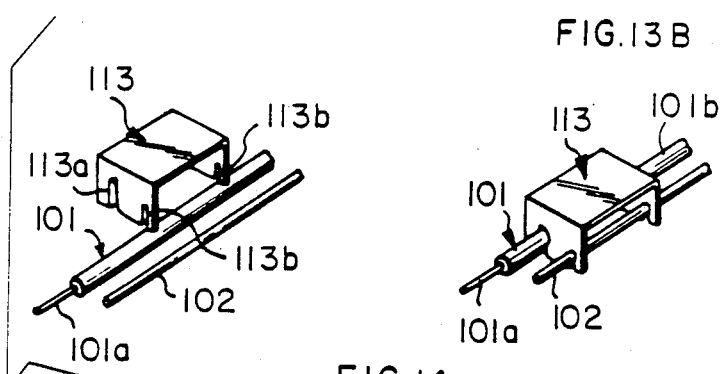
FIGS. 13A and 13B are respective perspective exploded and perspective views of only the optical fiber cable, the wire, and the contact and retaining plate.

An explanation of the engagement of this contact and retaining plate 113 with the cable 101 and the wire 102, with reference to FIGS. 13A and 12B, is described as follows. FIGS. 13A and 13B are perspective views showing the end portions of the optical fiber cable 101 and the wire 102 that are to be inserted in the connector housing 111, the core 101a being exposed by stripping the jacket 101b at the end portion of the optical fiber cable 101, and the wire 102 having the conductor still insulated.

The contact and retaining plate 113 is made from a sheet of conductive material, such as metal, and folded into a U-shape. Both leg portions of plate 113 are respectively formed with a slot 113a for the optical fiber cable 101 and a slot 113b for the wire 102. Therefore, when the contact plate 113 is inserted into housing 111 with the leg portions extending into slots 111f of housing 111, the optical fiber cable 101 and the wire 102 enter the slots 113a, 113b respectively. The width of the slot 113a is smaller than the outer diameter of the jacket 101b of the cable 101 and larger than the diameter of the core 101a thereof, and thus the edges of slot 113a are pressed into and penetrate the jacket 101b and are engaged with the cable 101. Similarly, for the wire 102, the edges of slot 113b are pressed into and penetrate the insulation of wire 102 and are engaged with the wire 102. In this case, the edges of slot 113b are connected with the conductor of the wire, and thus the wire 102 and the contact plate 113 are electrically connected. Plates 113 are secured in housing 111 in the same manner as plates 20, 60, 85 and 95.

Figure 14:
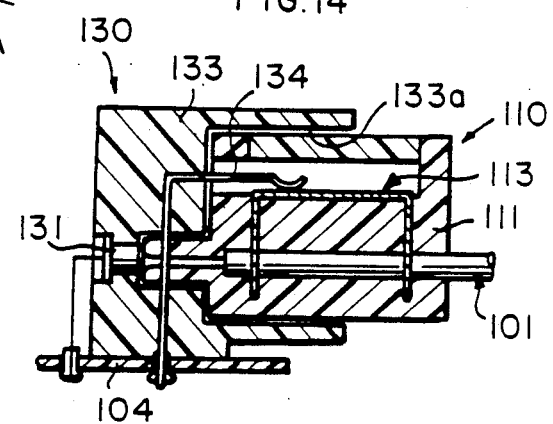
FIGS. 14 and 15 are cross-sectional views showing the hybrid optical-electrical connector member connected with the matable connector member.
Figure 15:
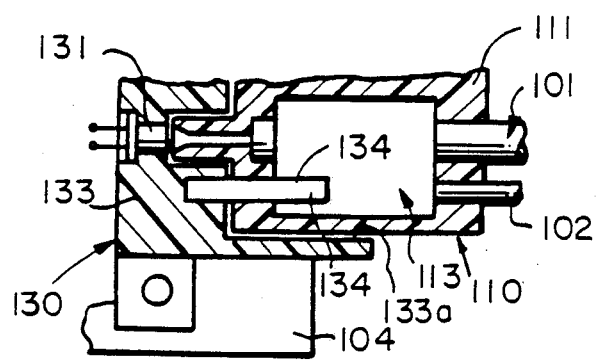

The cross-sectional views of FIGS. 14 and 15 show the hybrid optical-electrical connector 110 connected with the connector 130. The connector 130 is composed of the housing 133, having an electrical contact 134, light-emitting element 131, and photosensitive element 132 (only the light-emitting element 131 is shown in FIGS. 14 and 15) arranged in housing 133. Connector 130 is mounted to the P.C. board, and the light-emitting element 131, the photosensitive element 132, and the contact 134 are connected with the circuitry on the P.C. board. Further, although the contact 134 should not appear in the cross-section shown in FIG. 14, it is shown to illustrate the way in which the contact provides power to the P.C. board. The connector housing 133 has an opening 133a for receiving hybrid optical-electrical connector 110, and when the connector 110 is inserted in opening 133a, as shown in FIG. 14, then the connection of both connectors 110 and 130 is completed. Thus, the front end face of the cylindrical portion 111c of the connector 110 is brought adjacent and opposite the light-emitting element 131 or the photosensitive element 132, and accordingly, the end face of the core 101a is opposed to the element 131 or 132, thereby allowing transfer of the light signals. Moreover, the end of the contact 134 enters the cavity 111d of the connector housing 111 and is connected with an upper face of the contact plate 113, therefore, the contact 134 and the contact plate 113 are electrically connected, and thus the electric power is also transferable. Accordingly, by using the hybrid optical-electrical connector of this invention, the transfer of both the light signals and the electric power can be conducted by a connector having a simplified structure.

Figure 16:
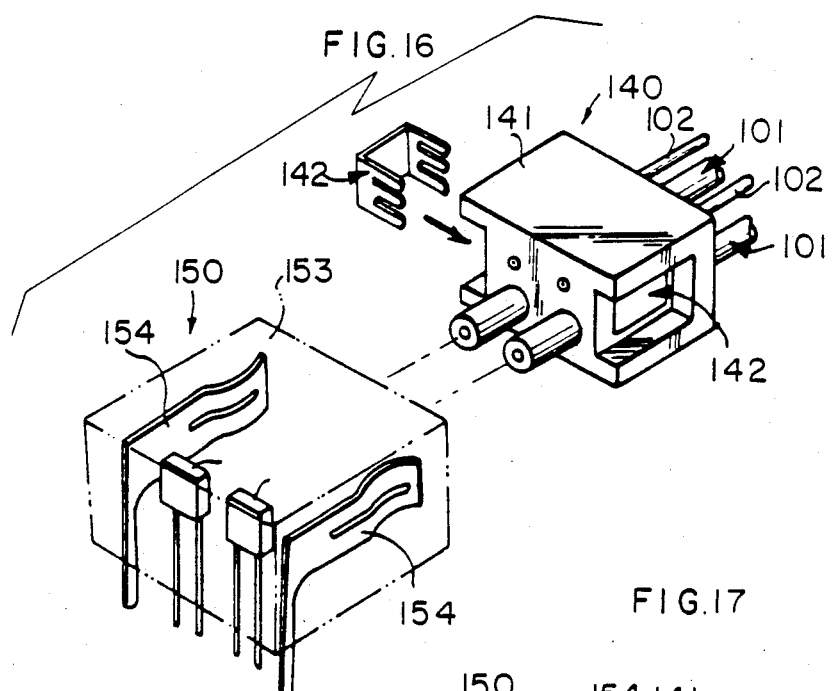
FIG. 16 is a perspective exploded view of another embodiment of the invention showing a hybrid optical-electric connector member together with the matable connector member.
Figure 17:
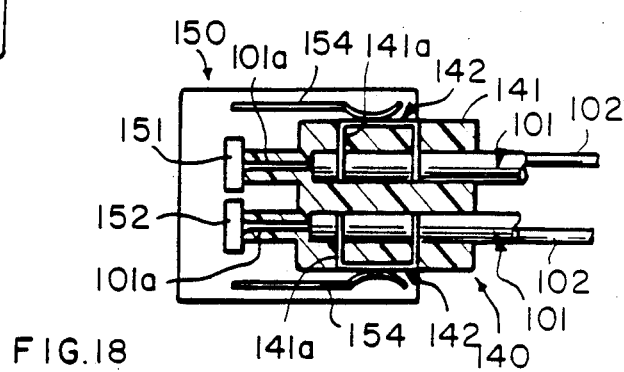
FIG. 17 is a cross-sectional view showing both connector members of FIG. 16 connector.

FIG. 16 is a perspective view showing a further embodiment of the hybrid optical-electrical connector of this invention. In this embodiment, in the hybrid optical-electrical connector 140, the wires 102 and the optical fiber cables 101 are arranged in two rows and are inserted and retained at the upper portion and the lower portion of connector housing 141 respectively, by means of contact and retaining plates 142 which are inserted into slots 141a from each side of the connector housing 141. Note, since the engagement of the contact and retaining plates 142 with optical fiber cables 101 and wires 102 is the same as above, an explanation thereof is omitted. Accordingly, in the matable connector 150 to which connector 140 is connected, contacts 154 are arranged at both sides thereof along a cavity in which connector 140 is received, thus contacts 154 are connected with the contact and retaining plates 142 at each side, as shown in FIG. 17. At the same time, an end of the optical fiber core 101a of the optical fiber cable 101 is positioned opposite the light-emitting element 151 or the photosensitive element 152 enabling transfer of light signals.

Figure 18:
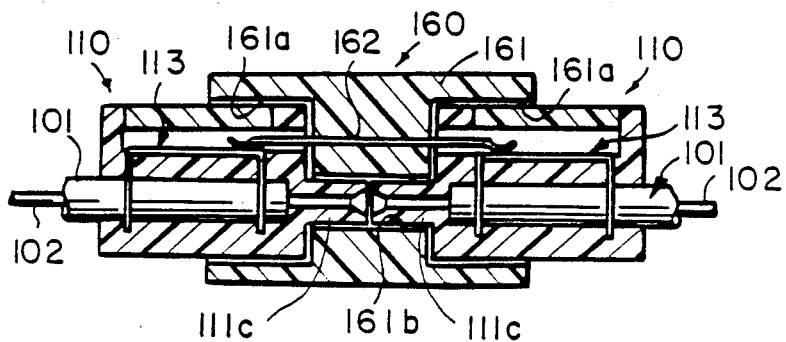
FIG. 18 is a cross-sectional view of an additional embodiment showing hybrid optical-electrical connectors of this invention connected within a housing.

FIG. 18 shows a connector in which a connection is made between two ends of optical fiber cables 101. Hybrid optical-electrical connectors 110 of FIGS. 11-15 are connected to the end portions of two cables 101 and wires 102 respectively and then are interconnected by a connector 160. Connector 160 includes a housing 161 having cavities 161a at both ends thereof to receive the hybrid optical-electrical connectors 110, and a contact 162 secured inside housing 161 with both ends thereof projecting inside each cavity 161a. The housing 161 also has a hole 161b formed therein that extends between both cavities 161a.

The connectors 110 are inserted in respective cavities 161a, and thus each end of contact 162 is connected with contact plates 113 of the connectors 110. Therefore, the electrical connection of the wires 102 of the connectors 110 is completed through the contact 162. At the same time, the cylindrical portions 111c of the connectors 110 enter hole 161b, and therefore, the ends of cylindrical portions 111c are positioned opposite each other, thereby enabling a transfer of light signals between the optical fiber cables 101.

The above explanation of FIGS. 11-18 is directed to optical fiber cable and wires in the hybrid optical-electrical connectors that are separately secured in parallel in the connector housing; however in the optical-electrical hybrid connection shown in FIGS. 19A and 19B, the cable 103 comprises a cable in which the optical fiber core 103d is insulated by sleeve 103c and surrounded by a plurality of conductors 103b, then covered with an insulation jacket 103a. Cable 103 not only enables the transmission of both light signals and electrical power by single cable line, but also has an advantage of an increased strength of the cable 103 which is provided by the conductors 103b.

As shown in FIG. 21, in the hybrid optical-electrical connector 170, the cable 103 is retained in the connector housing 171 by engagement with contact and retaining plate 173 when the end portion thereof is inserted in the connector housing 171, and the basic structure is similar to the hybrid optical-electrical connector 110 shown in FIG. 11. Therefore, an explanation will be omitted since the structure of the matable connector 180 and the method of connection with connector 180 are the same as that of FIG. 11. However, as shown in FIGS. 19A and 20B, the engagement of the contact and retaining plate 173 with the cable 103 is different in that the edges of slots 173a of the contact plate 173 are pressed into and penetrate the outer insulation 103a of the cable 103, so that the contact plate 173 is electrically connected with the conductors 103b of the optical fiber cable 103.

Figure 22:
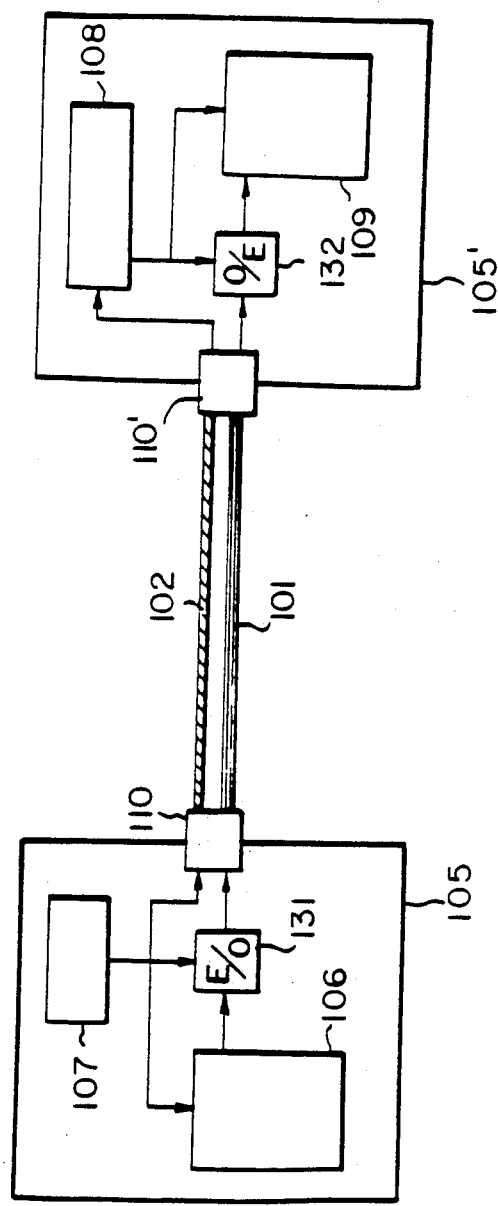
FIG. 22 is a schematic circuit diagram of a system which conducts an information transfer by light signals by using the hybrid optical-electrical connector member of the present invention.

Next, FIG. 22 shows a system which conducts a transfer of information by light signals by using the hybrid optical-electrical connectors of FIGS. 11-15. In this system the contact between the transmitting device 105 and the receiving device 105' is maintained with the optical fiber cable 101. In this system, a power supply 107 is provided only at the transmitting device 105, and therefore, the wire 102 for supplying operating power to the stabilizing circuit 108, the photosensitive element 132, and the electronic circuit 109 at the device 105' is arranged in parallel with the optical fiber cable 101. The connection of the ends of the optical fiber cable 101 and wire 102 with the transmitting device 105 and receiving device 105' is conducted by the above-mentioned hybrid optical-electrical connectors 110, 110' of this invention. The transmitting device 105 comprises a light-emitting element 131 which is positioned adjacent the front end face of the optical cable 101 in the hybrid optical-electrical connector 110, an electronic circuit 106 which transmits the electric signal to this light-emitting element 131 to generate a specified light signal, and a power supply 107 for supplying operating power to the electronic circuit 106 and element 131. Therefore, an electric signal is emitted from the electronic circuit 106 to the light-emitting element 131, and then a light signal specified by this emission is transmitted by the light-emitting element 131 to the optical fiber cable 101. Further, the power supply 107 is connected to a contact plate inside the hybrid optical-electrical connector 110, and thus power is sent to the wire 102 through this contact plate.

On the other hand, the receiving device 105' comprises a photosensitive element 132, a stabilizing circuit 108, and an electronic circuit 109. The stabilizing circuit 108 stabilizes the power transmitted from the power supply 107 through the wire 102 to operate the photosensitive element 132 and the electronic circuit 109. The photosensitive element 132 and the electronic circuit 109 are operated by receiving power from circuit 108. The photosensitive element 132 is positioned adjacent to the front end face of the optical cable 101 in the hybrid optical-electrical connector 110', and is used for a photoelectronic transfer of the light signal transmitted through the optical fiber cable 101. The electric power transferred as described above is utilized by electronic circuit 109.

According to this invention, in the hybrid optical-electrical connector the end portions of the optical fiber cable and the wire are inserted in the connector housing and retained therein by engagement with the contact and retaining plate which is fitted inside the connector housing, and at the same time, the contact plate is connected with the conductor of the wire, and the transfer of the light signal is conducted by positioning the end face of the optical fiber cable core adjacent to a photo-electronic element, and further, the transfer of the electric power is conducted by connecting the contact and retaining plate with an electric contact when this hybrid optical-electrical connector is connected with a matable optical-electrical connector, therefore, both the light signals and electric power can be transferred by a single connector. Accordingly, the structure and assembly is simplified and the size of the hybrid optical-electrical connector is reduced, and the manufacturing cost is also reduced.

We claim:

1. A connector for connection to an optical cable constructed with an outer jacket encircling an optical fiber, the connector comprising;
    a housing having an axially oriented passageway for receiving an optical cable,
    recess means in the housing communicating with the passageway,
    retaining means for retaining an optical cable to be received by the passageway, said retaining means comprising a plate having a slot therein for engagement with said optical cable, and constructed to be driven into the recess means and to extend partially into the passageway and to penetrate said optical cable, where said slot has a lateral dimension intermediate the diameters of said optical fiber and said outer jacket to engage said optical cable while avoiding compression of said optical fiber, and positive securing means on the retaining means for being secured to the housing within the recess means, where said positive securing means has a resilient projection provided adjacent said slot and adapted to interengage with a laterally disposed wall of said recess means, the resilient projection extends from the positive securing means in a direction which is essentially perpendicular to the plane of the positive securing means, such that as the resilient projection is resiliently deformed, the resilient deformation will occur in a plane which is perpendicular to the plane of the positive securing means, thereby insuring that the deformation of the resilient projection will not cause the positive securing means to be moved into said optical cable.

2. A connector as recited in claim 1, wherein said retaining means is a U-shaped plate having an optical cable engaging slot in each leg thereof.

3. A connector as recited in claim 1, wherein the passageway has a portion slightly larger than the diameter of an optical fiber or said optical cable for receiving an exposed end of said fiber.

4. A connector as recited in claim 1, wherein a photoelectronic element is aligned with the passageway for alignment with a light transmitting end of an optical cable to be received in the passageway.

5. A connector as recited in claim 1, wherein said retaining means is a planar.

6. A connector as recited in claim 1, wherein the retaining means is conductive, the housing includes a wire receiving means for receiving an electrical wire, and the retaining means includes a slot with wire engaging edges for engaging an electrical wire to be received in said wire receiving means.

7. An connector as recited in claim 1, wherein the housing includes a wire receiving means for receiving an electrical wire, and the retaining means includes a slot with wire engaging edges for engaging an electrical wire to be received in said wire receiving means.

8. A connector for connection to an optical cable constructed with an outer jacket encircling an optical fiber, the connector comprising;

a first housing having a passageway for receiving an optical cable, recess means in the housing communicated with the passageway, conductive retaining means for retaining an optical cable to be received by the passageway, spaced apart plate edges of the retaining means constructed to be driven into the recess means and to extend partially into the passageway and to penetrate said optical cable, said edges being spaced apart a distance less than the diameter of a jacket of said optical cable to penetrate said jacket, and said edges being spaced apart a distance greater than the diameter of an optical fiber of said optical cable to avoid compression of said optical fiber, securing means on the retaining means for being secured to the first housing within the recess means, a second housing matable with the first housing, and a conductive electrical contact in the second housing for electrically engaging said conductive retaining means.

9. A connector as recited in claim 8, and further comprising a photoelectronic element mounted in the second housing and aligned with said passageway for alignment with said optical fiber of said optical cable.

10. A connector as recited in claim 8, wherein the passageway has a portion slightly larger than the diameter of an optical fiber of said optical cable for receiving an exposed end of said fiber.

11. A connector as recited in claim 8, wherein said retaining means has a second set of edges spaced apart the same distance as are the first recited spaced apart edges and constructed to be driven into the recess means and to extend partially into the passageway and to penetrate said jacket of said optical cable.

12. A connector as recited in claim 8, wherein said retaining means is planar.

13. A connector as recited in claim 8, wherein the first housing includes a wire receiving means for receiving an electrical wire, and the retaining means includes a slot with wire engaging edges for engaging an electrical wire to be received in said wire receiving means.

14. A connector for connection to an optical cable constructed with an outer jacket encircling an optical fiber, the connector comprising:

a housing having a passageway for receiving an optical cable, recess means in the housing communicating with the passageway, retaining means for retaining an optical cable to be received by the passageway, said retaining means comprising a plate having a slot therein for engagement with said optical cable, and constructed to be driven into the recess means and to extend partially into the passageway and to penetrate said optical cable, where said slot has a lateral dimension intermediate the diameters of said optical fiber and said outer jacket to engage said optical cable while avoiding compression of said optical fiber, and positive securing means provided on the retaining means, for securing the retaining means in the housing, the positive securing means has resilient projections which extend therefrom, the resilient projections extend outwardly from the plane of the positive securing means, such that as the retaining means are inserted into the housing, the resilient projections will engage walls of the housing, causing the resilient projections to deform in a direction which is essentially parallel to the axis of the optical cable, thereby insuring that the deformation of the resilient projections will not damage the optical cable.

15. A connector for connection to an optical cable constructed with an outer jacket encircling an optical fiber, comprising:

a housing having an axial passageway for receiving the optical cable;

recess means in the housing communicating with the passageway;

retaining means for retaining the optical cable in the passageway, said retaining means having a U-shaped configuration including substantially parallel leg members interconnected by a plate member at upper ends of said leg members, said leg members having U-shaped slots extending inwardly from the bottom free ends thereof, said slots having a lateral dimension intermediate the diameters of the optical fiber and the outer jacket of the optical cable so that when the leg members are completely driven into the recess means by application of a driving force to the plate member, the edges of the slots penetrate the outer jacket without compressing the optical fiber thereby securing the optical cable in the passageway; and resilient securing means provided proximate the leg members, the resilient securing means extend from the leg members in an outward direction from the plane of the leg members, such that as the resilient securing means are caused to move, the movement of the resilient securing means will occur in a direction which is parallel to the axis of the optical fiber, thereby insuring that the movement of the resilient securing means will not damage the optical fiber.

16. A connector as recited in claim 15, wherein said securing means comprise outwardly directed resilient projections of each said leg member, where said projections extend outside the plane of said plate member so as to interengage with a wall of said recess means.

17. A connector as recited in claim 15, wherein the passageway has a portion slightly larger than the diameter of an optical fiber of said optical cable for receiving an exposed end of said fiber.

18. A connector as recited in claim 15, wherein a photoelectronic element is aligned with the passageway for alignment with a light transmitted end of an optical cable to be received in the passageway.

19. A connector as recited in claim 15, wherein the retaining means is conductive, the housing includes a wire receiving means for receiving an electrical wire, and the retaining means includes a slot with wire engaging edges for engaging an electrical wire to be received in said wire receiving means.

20. A connector as recited in claim 15, wherein the housing includes a wire receiving means for receiving an electrical wire, and the retaining means includes a slot with wire engaging edges for engaging an electrical wire to be received in said wire receiving means.

* * * * *

UNITED STATES PATENT OFFICE
CERTIFICATE OF CORRECTION

Patent No. 4,986,625          Dated January 22, 1991

Inventor(s) Hiromi Yamada, Eiji Yoshida, Kenji Takahasi

It is certified that error appears in the above-identified patent and that said Letters Patent is hereby corrected as shown below:

In claim 3, column 10, line 46, the word "or" should be --of--.

In claim 5, column 10, line 53, delete the word "a".

In claim 8, column 11, line 3, the word "communicated" should be --communicating--.

In claim 18, column 12, line 51, the word "transmitted" should be --transmitting--.

Signed and Sealed this

Twenty-second Day of September, 1992

Attest:

DOUGLAS B. COMER

Attesting Officer     Acting Commissioner of Patents and Trademarks